July 29, 1924.

W. R. DAVIS

SAFETY BANK CHECK

Filed March 10, 1923

1,502,981

Inventor.
William R. Davis
by H. J. S. Dennison
Atty

Patented July 29, 1924.

1,502,981

UNITED STATES PATENT OFFICE.

WILLIAM RICHARD DAVIS, OF TORONTO, ONTARIO, CANADA, ASSIGNOR OF ONE-HALF TO THOMAS TWEDDLE, OF TORONTO, CANADA.

SAFETY BANK CHECK.

Application filed March 10, 1923. Serial No. 624,152.

*To all whom it may concern:*

Be it known that I, WILLIAM RICHARD DAVIS, a subject of the King of Great Britain, and resident of the city of Toronto, county of York, Province of Ontario, in the Dominion of Canada, have invented certain new and useful Improvements in a Safety Bank Check, described in the following specification and illustrated in the accompanying drawing, that forms part of the same.

The objects of this invention are to protect the maker of a check, draft or bill of exchange from fraudulent tampering with same to raise the amount and to accomplish this result in a manner which will be very simple to handle.

The principal feature of the invention consist in the arrangement of a plurality of spaces numerically enumerated to indicate the number of figures in the total amount, and in the arrangement of spaces in numbered sequence to indicate the sum of the figures in the amount.

The drawing represents the preferred form of the invention as applied to the check.

The check is printed with the usual indication of the bank on which it is drawn with instructions to pay to John Doe. Below this indication are arranged a plurality of longitudinal spaces which are numbered at one end as 2, 3, 4, 5, 6, 7, 8 etc., the last being reserved for signatures. These spaces are arranged to receive the written amount in dollars and spaces for indicating the cents are provided at the right hand ends.

The amount for which the check is drawn is intended to be numerically indicated preferably at the right hand end of the check and below this indication is arranged a space which is sub-divided and contains serial numbers here shown from one to seventy-two though that may be continued farther if desired.

In making out a check the space chosen for writing out the amount in dollars will be one representing the number of figures there are in the amount to be paid. For instance, as shown in the drawing, a check is made out for the sum of $4.63. This is numerically indicated and it will be immediately seen that there are three figures in the sum, consequently the amount will be written in space number three. If the amount were for $24.63 there would be four figures and the amount would be written in space number four. This feature forms a very strong element of protection but in conjunction with this the arrangement of serial numbers shown provides a checking means and is used to indicate the sum of the figures in the amount by cancelling the number corresponding with such total. In the example shown the amount $4.63 shows the figures 4, 6 and 3. These added together total thirteen and the figures 13 in the serial numbers is cancelled.

If an attempt to raise a check such as herein shown and described is made it is necessary to erase the written description of the amount in dollars from the space in which it is placed, for unless it is in the line numbered to correspond with the number of figures in the sum it will immediately show that the check is false or has been tampered with, but if this erasure or change could be effected successfully it is also necessary to erase the ink mark or other printed defacement of the serial number at the right hand side. This is of course practically impossible especially if the practice of perforating the number be followed.

Perforation can be effected by the use of a punch or the point of a pencil or pen.

A check such as described will effectively prevent the frudulent practices of raising the amount after a check has been signed, and will prove to be an effective safe-guard to the user and to the bank.

What I claim as my invention is:—

1. A safety bank check having a plurality of spaces for the reception of the written designation of the amount to be paid, such spaces being numbered to indicate the number of figures in the amount to be paid.

2. A safety bank check having a plurality of spaces for the reception of the written designation of the amount to be paid, such spaces being numbered to indicate the number of figures in the amount to be paid, and a checking means comprising a serial arrangement of numerals.

3. A safety bank check having below the name of the payee a column of spaces for the written insertion of the amount, such spaces being numbered serially 2, 3, 4, to indicate the number of figures in the amount, and an arrangement of squares adjacent to said spaces containing a serial arrangement of numerals from one up adapted to be cancelled to indicate the sum of the numerals in the amount for which the check is drawn.

WILLIAM RICHARD DAVIS.